United States Patent
Jindal et al.

(10) Patent No.: US 12,413,527 B2
(45) Date of Patent: Sep. 9, 2025

(54) OFFLOADING NETWORK ADDRESS TRANSLATION AND FIREWALL RULES TO TIER-1 ROUTERS FOR GATEWAY OPTIMIZATION

(71) Applicant: VMware LLC, Palo Alto, CA (US)

(72) Inventors: Gaurav Jindal, Pune (IN); Chandan Ghosh, Bangalore (IN); Neeraj Mantri, Pune (IN); Rajesh Sahu, Bangalore (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/607,325

(22) Filed: Mar. 15, 2024

(65) Prior Publication Data

US 2025/0119383 A1 Apr. 10, 2025

(51) Int. Cl.
| | | |
|---|---|---|
| *H04L 47/10* | (2022.01) | |
| *H04L 12/66* | (2006.01) | |
| *H04L 61/2521* | (2022.01) | |
| *H04L 61/2557* | (2022.01) | |

(52) U.S. Cl.
CPC .............. *H04L 47/18* (2013.01); *H04L 12/66* (2013.01); *H04L 61/2528* (2013.01); *H04L 61/2557* (2013.01)

(58) Field of Classification Search
None
See application file for complete search history.

(56) References Cited

U.S. PATENT DOCUMENTS

| | | | |
|---|---|---|---|
| 10,880,265 B1* | 12/2020 | Li | H04L 63/164 |
| 11,375,005 B1* | 6/2022 | Rolando | H04L 45/22 |
| 2017/0063782 A1* | 3/2017 | Jain | H04L 63/0236 |
| 2018/0062880 A1* | 3/2018 | Yu | G06F 9/5072 |
| 2018/0287996 A1* | 10/2018 | Tripathy | H04L 61/2503 |
| 2019/0245949 A1* | 8/2019 | Wang | H04L 41/0895 |
| 2020/0106706 A1* | 4/2020 | Mayya | H04L 45/38 |
| 2020/0186496 A1* | 6/2020 | Mohanty | H04L 63/029 |
| 2021/0067378 A1* | 3/2021 | Coimbatore Natarajan ........ H04L 67/10 |
| 2022/0231944 A1* | 7/2022 | Jindal | H04L 45/74 |
| 2022/0231993 A1* | 7/2022 | Sharma | H04L 63/0272 |
| 2022/0239629 A1* | 7/2022 | Wu | H04L 12/66 |
| 2022/0263791 A1* | 8/2022 | Brar | G06F 9/45558 |
| 2022/0263793 A1* | 8/2022 | Baker | H04L 61/2557 |
| 2022/0286431 A1* | 9/2022 | Winn | H04L 61/4511 |

(Continued)

*Primary Examiner* — Phyllis A Book
(74) *Attorney, Agent, or Firm* — King Intellectual Asset Management

(57) ABSTRACT

The disclosure provides an approach for gateway optimization. Embodiments include receiving, at a first gateway associated with a first tenant within a data center, a packet directed to a first public network address of an endpoint associated with a second tenant within the data center. Embodiments include performing, by the first gateway, network address translation (NAT) to translate the first public network address to a private network address of the endpoint. Embodiments include forwarding, by the first gateway, the packet to an edge gateway of the data center. Embodiments include forwarding, by the edge gateway, the packet to a second gateway associated with the second tenant within the data center without sending the packet to a public interface of the edge gateway. Embodiments include forwarding, by the second gateway, the packet to the endpoint.

20 Claims, 4 Drawing Sheets

(56) References Cited

U.S. PATENT DOCUMENTS

| | | | |
|---|---|---|---|
| 2022/0394017 A1* | 12/2022 | Solanki | H04L 63/0428 |
| 2023/0031821 A1* | 2/2023 | Keane | H04L 12/4633 |
| 2023/0420147 A1* | 12/2023 | Baker | H04L 61/4511 |
| 2024/0406101 A1* | 12/2024 | Hawari | H04L 45/64 |

* cited by examiner

OFFLOADING NETWORK ADDRESS TRANSLATION AND FIREWALL RULES TO TIER-1 ROUTERS FOR GATEWAY OPTIMIZATION

CROSS-REFERENCES

This application claims the benefit of Indian patent application Ser. No. 202341066377, entitled "OFFLOADING NETWORK ADDRESS TRANSLATION AND FIRE-WALL RULES TO TIER-1 ROUTERS FOR GATEWAY OPTIMIZATION," filed on Oct. 4, 2023, of which is hereby incorporated by reference in its entirety.

BACKGROUND

A software defined datacenter (SDDC) provides a plurality of host computer systems (hosts) in communication over a physical network infrastructure of a datacenter such as an on-premise datacenter or a cloud datacenter. Each host has one or more virtualized endpoints such as virtual machines (VMs), containers, or other virtual computing instances (VCIs). These VCIs may be connected across the multiple hosts in a manner that is decoupled from the underlying physical network, which may be referred to as an underlay network. The VCIs may be connected to one or more logical overlay networks which may be referred to as software-defined networks (SDNs) and which may each span multiple hosts. Though certain aspects herein may be described with respect to VMs, it should be noted that the techniques herein may similarly apply to other types of VCIs.

Any arbitrary set of VCIs in a datacenter may be placed in communication across a logical Layer 2 network by connecting them to a logical switch. A logical switch is collectively implemented by at least one virtual switch on each host that has a VCI connected to the logical switch. Virtual switches provide packet forwarding and networking capabilities to VCIs running on the host. The virtual switch on each host operates as a managed edge switch implemented in software by the hypervisor on each host. As referred to herein, the terms "Layer 2," "Layer 3," etc. refer generally to network abstraction layers as defined in the Open Systems Interconnection (OSI) model. However, these terms should not be construed as limiting to the OSI model. Instead, each layer should be understood to perform a particular function which may be similarly performed by protocols outside the standard OSI model. As such, methods described herein are applicable to alternative networking suites.

A logical Layer 2 network infrastructure of a datacenter may be segmented into a number of Layer 2 (L2) segments, each L2 segment corresponding to a logical switch and the VCIs coupled to that logical switch. In some cases, one or more L2 segments may be organized behind a tenant gateway (e.g., a Tier-1 service router) that is internal to the datacenter and connects endpoints in the one or more L2 segments to other endpoints within the data center, including an edge gateway (e.g., a Tier-0 service router) that provides connectivity between endpoints inside the data center and endpoints external to the data center. Techniques for forwarding traffic between endpoints in logical networks via logical routers and logical switches are described in more detail in U.S. Pat. No. 9,787,605, the contents of which are incorporated herein by reference in their entirety.

An edge gateway of a data center may process a significant amount of traffic from both inside and outside the data center, and may expend considerable computing resources performing various functionality with respect the received traffic. For example, the edge gateway may perform network address translation (NAT) and firewall functionality for traffic that it receives. NAT generally involves translating between public network address and private network addresses. For example, a source NAT (SNAT) table may be configured to allow translation of source network addresses of all packets sent from private endpoints within the data center to one or more public network addresses. Similarly, a destination NAT (DNAT) table may be configured to allow translation of a destination network address of each packet directed to a public network address of an endpoint within the data center to the individual private network address of that endpoint. Firewall functionality generally involves applying firewall rules (e.g., configured by a network administrator) to packets in order to determine whether to allow or block the packets.

The large amounts of NAT and firewall processing performed by the edge gateway can result in decreased performance and bottlenecks, thereby negatively affecting the flow of traffic within the data center. For example, when the edge gateway performs NAT and firewall functionality for packets sent to and from the data center as well as for packets sent between endpoints within the data center (e.g., packets sent from endpoints within the data center and directed to public network addresses of other endpoints within the data center), the edge gateway may become overloaded.

Accordingly, there is a need in the art for improved techniques for reducing congestion at edge gateways.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
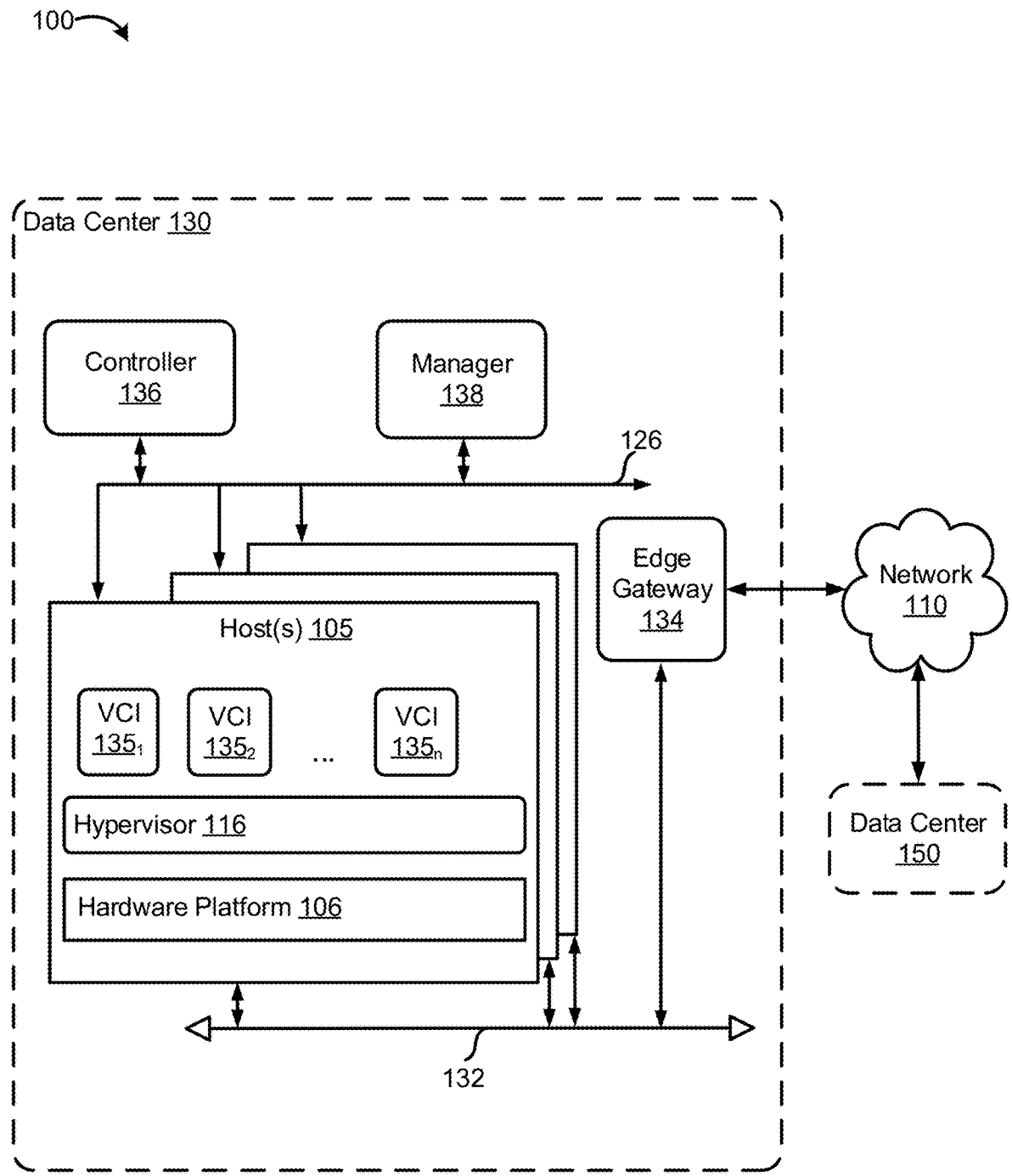
FIG. 1 depicts example physical and virtual network components with which embodiments of the present disclosure may be implemented.

The present disclosure provides an approach for improving the performance of gateways in data centers. In particular, techniques described herein involve offloading network address translation (NAT) and/or firewall functionality from an edge gateway to one or more tenant gateways within a data center for handling NAT and/or firewall processing of packets sent between endpoints within the data center.

According to existing techniques, when a source endpoint (e.g., VM) behind a first tenant gateway of the data center sends a packet directed to public network address of a destination endpoint (e.g., VM) behind a second tenant gateway of the data center, that packet would be sent by the first tenant gateway to the edge gateway of the data center, and the edge gateway would perform NAT and/or firewall functionality for that packet. For example, a private interface of the edge gateway, which may be referred to as a service router (SR) of the edge gateway, would recognize the destination address of the packet as a public network address and forward the packet to a public interface of the edge gateway, which may be referred to as a distributed router (DR) of the edge gateway. The public interface would then perform NAT to translate the public network address of the destination endpoint to a private network address of the destination endpoint, and would also apply firewall rules to the packet to determine whether to allow or block the packet for transmission to the destination endpoint. The packet would then be "hairpinned" by the public interface of the edge gateway back to the private interface of the edge gateway, and then forwarded to the second tenant gateway, which would send the packet to the destination endpoint. Performing this process for all traffic sent to and from public network addresses of endpoints within the data center places a significant amount of load on the public interface of the edge gateway, thereby reducing performance and creating bottlenecks at a critical point in the flow of traffic both in and out of the data center and within the data center.

Therefore, according to certain embodiments, NAT tables and/or firewall rules applicable to endpoints with the data center are synchronized between the edge gateway of the data center and the other gateways within the data center, such as tenant gateways in front of L2 networks (e.g., corresponding to particular tenants) within the data center. As described in more detail below with respect to FIGS. 2-4, this synchronization of NAT tables and/or firewall rules may allow NAT and/or firewall functionality to be offloaded from the edge gateway to other gateways within the data center for traffic that is sent between endpoints within the data center. For example, when a source endpoint (e.g., VM) behind a first tenant gateway of the data center sends a packet directed to public network address of a destination endpoint (e.g., VM) behind a second tenant gateway of the data center, the first tenant gateway may recognize that the destination endpoint is within the data center based on the synchronized NAT table(s), and may perform NAT on the packet in order to translate the public network address of the destination endpoint to a private network address of the destination endpoint before the packet is even sent to the edge gateway. Thus, when the packet arrives at the private interface of the edge gateway, it will be recognized as being directed to a private network address within the data center, and so will not be forwarded to the public interface of the edge gateway but instead will be forwarded to the second tenant gateway.

Because the packet is not sent to the public interface of the edge gateway, which is generally the entity that performs firewall functionality, the packet will not have yet undergone firewall inspection when it arrives at the second tenant gateway. Thus, the second tenant gateway may apply the synchronized firewall rules to the packet in order to determine whether to allow or block the packet before transmitting it to the destination endpoint. In some embodiments, the second tenant gateway only performs firewall inspection if it determines based on some attribute(s) of the packet that it has not yet undergone firewall inspection. For example, packets that originate within the data center may be constructed in a particular manner, and tenant gateways in the data center may recognize packets that are constructed in the particular manner as packets that have not yet undergone firewall inspection. In other embodiments, packets that have undergone NAT at a tenant gateway may be modified (e.g., with a packet marker) to indicate that the packets will not undergo firewall inspection at the edge gateway, and therefore will arrive at a destination tenant gateway without having yet undergone firewall inspection. In still other embodiments, packets that undergo firewall inspection at the edge gateway (or otherwise) are modified (e.g., with a packet marker) to indicate that the packets have undergone firewall inspection.

Thus, techniques described herein reduce load at the edge gateway by performing NAT and/or firewall processing at other gateways within the data center (e.g., tenant gateways) for packets that are sent between endpoints within the data center and that require such functionality. By avoiding transmitting such packets to the public interface of the edge gateway at all, and by not performing NAT and/or firewall processing for such packets at the edge gateway, embodiments of the present disclosure improve performance of the edge gateway, avoid bottlenecks, and allow traffic to flow more efficiently both to and from the data center as well as within the data center.

FIG. 1 depicts example physical and virtual network components with which embodiments of the present disclosure may be implemented.

Networking environment 100 includes data centers 130 and 150 connected to network 110. Network 110 is generally representative of a network of computing entities such as a local area network ("LAN") or a wide area network ("WAN"), a network of networks, such as the Internet, or any connection over which data may be transmitted.

Data centers 130 and 150 each generally represent a set of networked computing entities, and may comprise a logical overlay network. Data center 130 includes host(s) 105, a gateway 134, a data network 132, which may be a Layer 3 network, and a management network 126. Data network 132 and management network 126 may be separate physical networks or different virtual local area networks (VLANs) on the same physical network. Data center 150 may comprise similar elements to those depicted in data center 130.

Each of hosts 105 may be constructed on a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 into multiple virtual computing instances (VCIs) $135_1$ to $135_n$ (collectively referred to as VCIs 135 and individually referred to as VCI 135) that run concurrently on the same host. VCIs 135 may include, for instance, VMs, containers, virtual appliances, and/or the like.

Hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In certain aspects, hypervisor 116 implements one or more logical entities, such as logical switches, routers, etc. as one or more virtual entities such as virtual switches, routers, etc. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine. Although aspects of the disclosure are described with reference to VMs, the teachings herein also apply to other types of virtual computing instances (VCIs) or data compute nodes (DCNs), such as containers, which may be referred to as Docker containers, isolated user space instances, namespace containers, etc. In certain embodiments, VCIs 135 may be replaced with containers that run on host 105 without the use of a hypervisor.

Edge gateway 134 provides VCIs 135 and other components in data center 130 with connectivity to network 110, and is used to communicate with destinations external to data center 130, such as data center 150. Edge gateway 134 may also provide connectivity between separate networking environments within data center 130, such as tenant networks (e.g., L2 networks) behind tenant gateways. Edge gateway 134 may be implemented as one or more VCIs, physical devices, and/or software modules running within one or more hosts 105. As described in more detail below with respect to FIGS. 2-4, NAT table(s) and/or firewall rule(s) may be synchronized between edge gateway 134 and one or more other gateways within data center 130, such as tenant gateways, in order to reduce load and improve performance of edge gateway 134.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Manager 138 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, manager 138 is a computer program that executes in a central server in networking environment 100, or alternatively, manager 138 may run in a VM, e.g. in one of hosts 105.

In an embodiment, manager 138 comprises both a network manager and a virtualization manager, which are both components of the management plane. The network manager may be configured to receive inputs from an administrator or other entity, e.g., via a web interface or API, and carry out administrative tasks for data center 130, including centralized network management and providing an aggregated system view for a user. The virtualization manager may be configured to carry out administrative tasks for data center 130, including managing hosts 105, managing VCIs 135 running within each host 105, provisioning VCIs 135 on hosts 105, transferring VCIs 135 from one host to another host, transferring VCIs 135 between data centers, transferring application instances between VCIs 135 or between hosts 105, and load balancing among hosts 105 within data center 130.

One or more components represented by manager 138 may be connected via a management network (e.g., an L2 network) behind a management gateway. Similarly, one or more components represented by controller 136 may be connected via a controller network (e.g., an L2 network) behind a controller gateway. The management gateway and//or the controller gateway may be configured to perform NAT and/or firewall functionality under certain circumstances in order to reduce load at edge gateway 134 as described herein.

Figure 2:
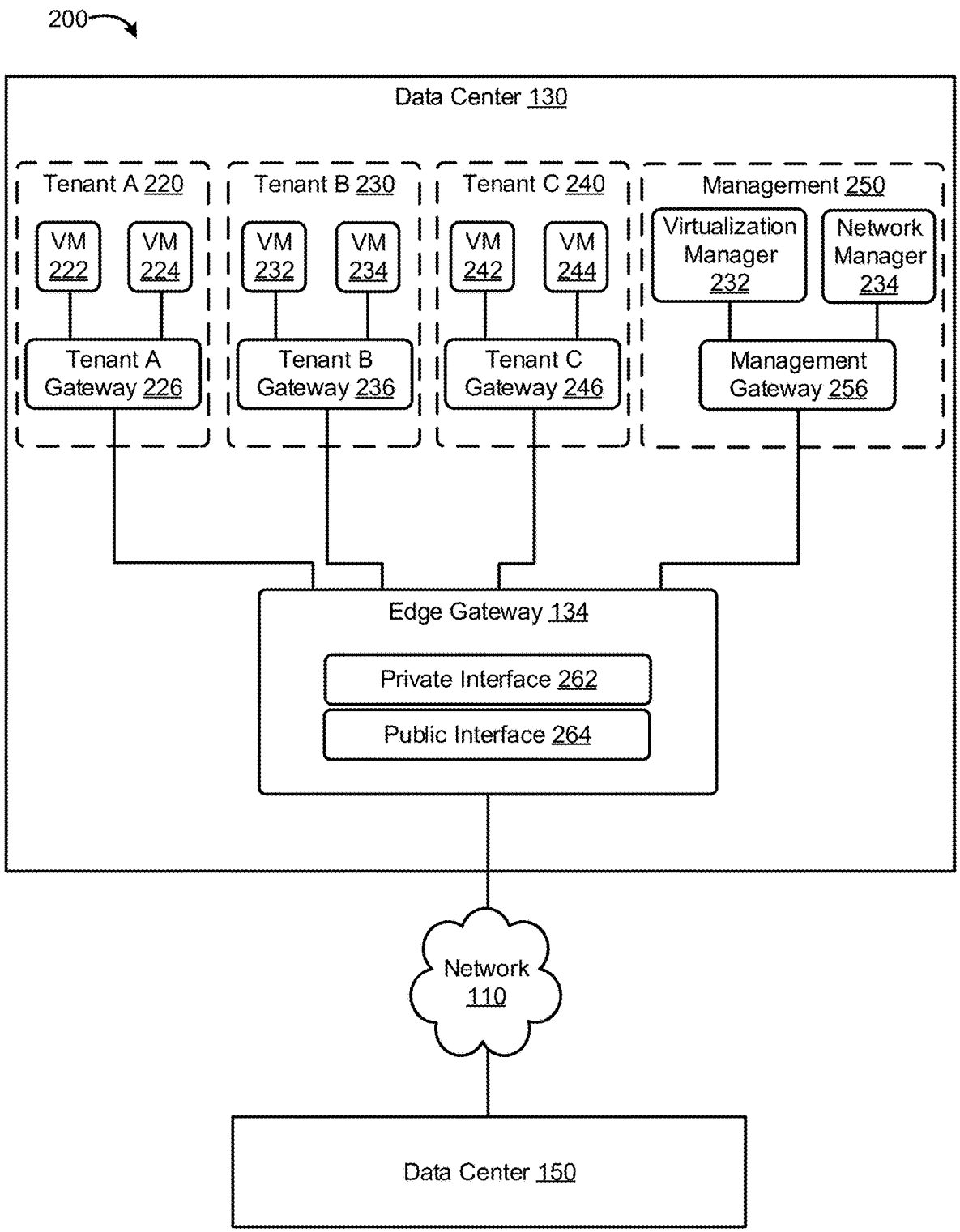
FIG. 2 depicts an example of connections between components related to gateway optimization.

FIG. 2 is an illustration 200 of connections between components related to gateway optimization according to embodiments of the present disclosure. Illustration 200 includes data center 130, edge gateway 134, network 110, and data center 150 of FIG. 1.

Four separate networking environments within data center 130 are depicted as tenant A 220, tenant B 230, tenant C 240, and management 250. For example, each of tenant A 220, tenant B 230, tenant C 240, and management 250 may correspond to one or more logical networks (e.g., L2 networks) that are located behind a corresponding gateway (e.g., tenant A gateway 226, tenant B gateway 236, tenant C gateway 246, and management gateway 256). Each of tenant A gateway 226, tenant B gateway 236, tenant C gateway 246, and management gateway 256 may comprise a Tier-1 service router (SR), while edge gateway 134 may comprise a Tier-0 SR.

A "tenant" may refer to a customer (e.g., business or other organization or entity) that maintains a separate networking environment within data center 130. VMs 222, 224, 232, 234, 242, and 244 within tenant A 220, tenant B 230, and tenant C 240 may be examples of VCIs 135 of FIG. 1. Virtualization manager 232 and network manager 234 may be components of manager 138 of FIG. 1. Each of tenant A gateway 226, tenant B gateway 236, tenant C gateway 246, and management gateway 256 may be implemented as one or more VCIs, physical devices, and/or software modules running within one or more hosts 105 of FIG. 1.

One or more endpoints in data center may have both a private network address and a public network address. For example a public network address of an endpoint within a particular networking environment (e.g., tenant B 230) may be provided to endpoints external to the particular networking environment in order to protect privacy and/or security by not sharing a private network address of that endpoint with such external endpoints. Endpoints for which a public network address is exposed may include those that provide services that can be invoked by external endpoints, such as a VM that operates as a content server.

Conventionally, all traffic directed to a public network address of an endpoint within data center 130 that also has a private network address would be processed through the public interface 264 of edge gateway 134. Public interface 264 generally represents a distributed router (DR) of edge gateway, while private interface 262 generally represents a service router (SR) of edge gateway 134. Prior to the development of the techniques described herein, a packet sent by an endpoint within data center 130 (e.g., VM 242) to a public network address of a destination endpoint within data center 130 (e.g., network manager 234) would be processed through public interface 264 of edge gateway 134, which would perform NAT and firewall processing for the packet prior to the packet being routed to the networking environment of the destination endpoint. However, as described below with respect to FIGS. 3-4, techniques described herein involve synchronizing NAT table(s) and/or firewall rule(s) from edge gateway 134 to other gateways within data center 130, such as tenant A gateway 226, tenant B gateway 236, tenant C gateway 246, and/or management gateway 256 so that NAT and/or firewall processing can be offloaded from edge gateway 134 under certain circumstances in order to reduce the load at edge gateway 134. For example, when a NAT table entry for an endpoint within data center 130 is configured at public interface 264 of edge gateway 134, that NAT table entry may also be sent to tenant A gateway 226, tenant B gateway 236, tenant C gateway 246, and/or management gateway 256. Similarly, when a firewall rule relating to an endpoint within data center 130 is configured at public interface 264 of edge gateway 134, that firewall rule may also be sent to tenant A gateway 226, tenant B gateway 236, tenant C gateway 246, and/or management gateway 256. These NAT table entries and/or firewall rules may be synchronized among the gateways whenever there is a change, addition, or removal of a NAT table entry or firewall rule. Generally, NAT table entries and firewall rules are configured by one or more administrators of data center 130 via virtualization manager 232 and/or network manager 234, and/or may be configured by individual tenants, and/or may be determined automatically based on configuration information provided by one or more network administrators and/or tenants. In some embodiments, firewall rules are created for control of North/South traffic (e.g., to and from the data center), but may also be applicable to East/West traffic (e.g., between endpoints within the data center). Similarly, some firewall rules are created for control of East/West traffic, but may also be applicable to North/South traffic.

Individual gateways, once synchronized, may determine whether to perform NAT and/or firewall functionality based on one or more conditions. For example, a tenant gateway that receives an outbound packet directed to a public network address of an endpoint within data center 130 may determine that it is to perform NAT for the packet. A tenant gateway that receives an inbound packet that indicates (e.g., via a format, packet marker, or other indication) that it has not yet undergone firewall inspection may determine that it is to perform firewall inspection for the packet. In some embodiments, rather than performing NAT, routing tables are configured such that packets direct to public network addresses of destination endpoints within data center 130 and sent from source endpoints within data center 130 are directly routed to the destination endpoints using the public network addresses. In such cases, firewall inspection must be performed by the gateway in front of the destination endpoint, since it will not be performed by public interface 264. Thus, techniques described herein for performing firewall inspection at gateways within data center 130 for inbound packets, upon determining that such inbound packets have not yet undergone firewall inspection, may be performed whether or not NAT is performed.

It is noted that a network address as discussed herein may refer to, for example, an internet protocol (IP) address, but also may refer to other types of network addresses.

Figure 3:
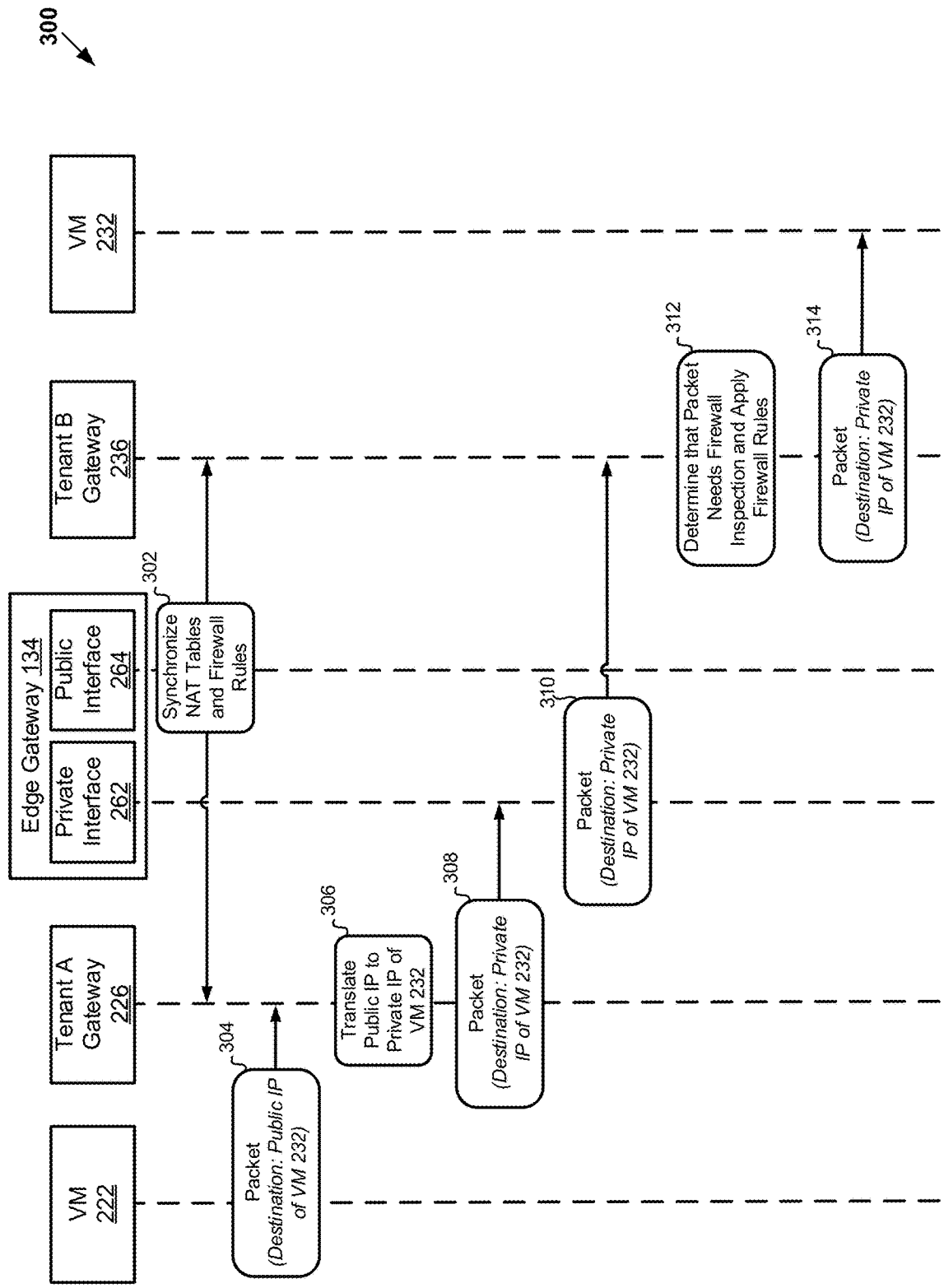
FIG. 3 depicts an example flow of messages and operations among components related to gateway optimization.

FIG. 3 depicts an example flow 300 of messages and operations among components related to gateway optimization. Flow 300 includes VM 222, tenant A gateway 226, edge gateway 134, private interface 262, public interface 264, tenant B gateway 236, and VM 232 of FIG. 2.

At step 302, one or more NAT table entries and/or one or more firewall rules are synchronized between public interface 264 of edge gateway 134 and tenant A gateway 226 and tenant B gateway 236. For example, the NAT table entries and/or firewall rules may be synchronized as they are configured, such that any NAT table entry or firewall rule configured at public interface 164 is sent to tenant A gateway 226 and tenant B gateway 236. It is noted that these NAT table entries and/or firewall rules may also be sent to other gateways within the data center. In some embodiments, NAT rules and/or firewall rules are managed at edge gateway 134 throughout the lifecycle of such rules, with the rules at edge gateway 134 serving as parents of child rules at other gateways (e.g., tenant A gateway 226 and tenant B gateway 236).

At step 304, VM 222 (which is within tenant A's networking environment) sends a packet destined to a public network address of VM 232 (which is within tenant B's networking environment). Tenant A gateway 226 may determine that the destination address of the packet corresponds to an endpoint within the data center. At step 306, tenant A gateway 226 translates the public network address of the VM 232 to the private network address of VM 232, such as based on a NAT table entry received a step 302, and sets a destination address of the packet to the private network address of the VM 232. This NAT operation may be referred to as DNAT.

At step 308, tenant A gateway 226 sends the packet, now destined to the private network address of VM 232, to private interface 262 of edge gateway 134. Private interface 262 determines that the packet is destined to an endpoint within the data center, and so does not send the packet to public interface 264. Rather, at step 310, private interface 262 forwards the packet to tenant B gateway 236. Thus, according to techniques described herein, edge gateway 134 may serve as a pass-through router (e.g., without performing NAT or firewall processing) for certain traffic, such as East/West traffic.

At step 312, tenant B gateway determines that the packet has not yet undergone firewall inspection and then performs firewall inspection on the packet, such as by applying one or more firewall rules received at step 302. In some embodiments, tenant B gateway 236 determines that the packet has not yet undergone firewall inspection based on one or more attributes of the packet, such as whether the packet indicates (e.g., by the way it is drafted or formatted or via a some other type of indication) that it originated within the data center, whether the packet includes a packet marker indicating that it has or has not undergone firewall inspection, and/or the like. In one embodiment, tenant A gateway 226 adds a packet marker to the packet prior to sending it to private interface 262, such as indicating that the packet originated within the data center and/or will not undergo firewall inspection at edge gateway 134. In other embodiments, edge gateway 134 adds packet markers to packets when it has performed firewall inspection, and tenant B gateway 236 determines that the packet has not yet undergone firewall inspection based on the absence of such a packet marker. In another embodiment, VM 222 generates the packet in such a manner as to indicate that the packet originated within the data center and/or that the packet will not undergo firewall inspection at edge gateway 134, such as including a packet marker, format, or other attribute indicating as such.

Tenant B gateway 236 applies one or more firewall rules to the packet in order to determine whether to allow or block the packet. For example, if a firewall rule indicates that VM 222 is permitted to communicate with VM 232 in the manner indicated by the packet, then tenant B gateway 236 may allow the packet. Otherwise, tenant B gateway 236 may block the packet, such as not sending the packet to VM 232, dropping the packet, and/or notifying one or more other entities (e.g. security component(s), network administrator(s), and/or the like) about the blocked packet.

At step 314, tenant B gateway 236 sends the packet to VM 232, such as after the packet passes firewall inspection and is allowed.

Tenant B gateway 236 may maintain state information related to the packet, such as flow information, and may perform NAT on one or more packets sent by VM 232 to VM 222 in response to the packet. For example, tenant B gateway 236 may perform SNAT on such response packets based on the state information, such as translating the private network address of VM 232 in the source address of a response packet to the public network address of VM 232 prior to sending the response packet to private interface 262 of edge gateway 134. Such a response packet would not be forwarded to public interface 264, since it would be directed to the private network address of VM 222, and would instead be sent directly from private interface 262 to tenant A gateway 226. Tenant A gateway may determine that the response packet has not yet undergone firewall inspection (e.g., in a similar manner to that described above with respect to step 312), and may perform firewall inspection on the response packet. Upon successful firewall inspection, tenant A gateway 226 may then send the response packet to VM 222.

North/South traffic (e.g., to and from the data center) may still be processed through public interface 264, as in conventional techniques, and NAT and/or firewall processing may performed in such cases at public interface 264. In such cases, firewall inspection would not need to be performed at a tenant gateway, as it has already been performed by edge gateway 134 (e.g., which may be indicated in the packet once firewall inspection has been performed, such as via a packet marker or lack thereof).

It is noted that techniques described herein for performing firewall inspection at gateways other than an edge gateway, such as based on determining that a packet has not yet undergone firewall inspection, may be performed with or without techniques described herein for performing NAT at such gateways. For example, even if public network addresses of endpoints within a data center are directly used to route the packets to those endpoints through routing configurations (e.g., avoiding the involvement of the public interface of the edge gateway for packets sent between endpoints within the data center), firewall inspection may still be performed at the endpoint gateway (e.g., the tenant gateway in front of the destination endpoint) as described herein.

Additionally, NAT and/or firewall processing may also be offloaded to the edge gateway from another gateway, such as from a tenant gateway. For example, if a tenant configures a firewall rule at a tenant gateway but does not want the tenant gateway's resources being overly burdened by application of that firewall rule, the tenant may provide configuration information such that the firewall rule is sent to the edge gateway to be applied to incoming packets directed to endpoints behind the tenant gateway that are received at the edge gateway prior to such packets being sent to the tenant gateway. In some cases, a tenant may pay an additional fee for such a service, such as to avoid using tenant resources for firewall processing.

Figure 4:
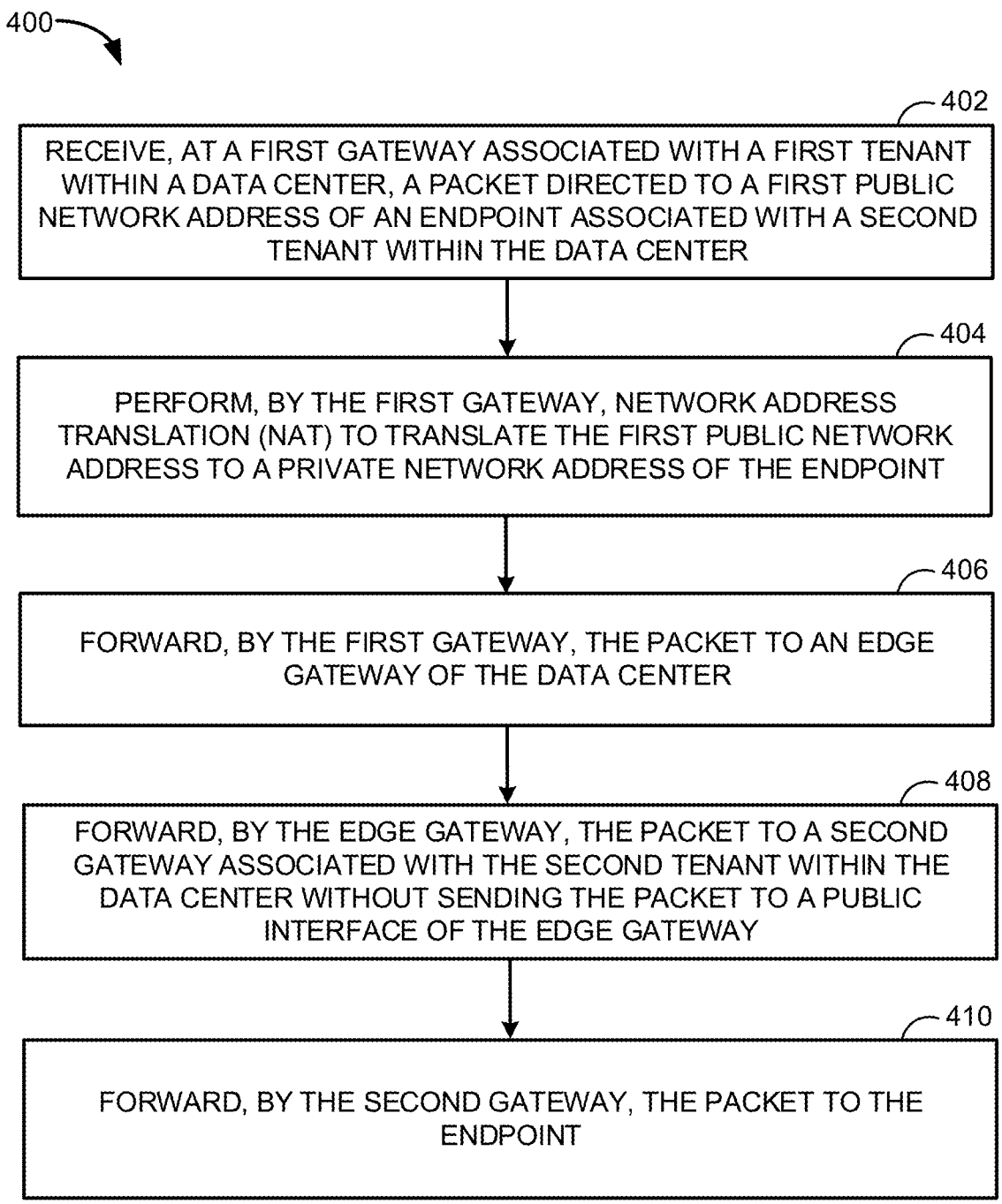
FIG. 4 depicts example operations related to gateway optimization according to embodiments of the present disclosure.

FIG. 4 depicts example operations 400 for on-demand packet redirection for performance management, according to embodiments of the present disclosure. For example, operations 400 may be performed by one or more components of data center 130 of FIGS. 1 and 2.

Operations 400 begin at step 402, with receiving, at a first gateway associated with a first tenant within a data center, a packet directed to a first public network address of an endpoint associated with a second tenant within the data center.

Operations 400 continue at step 404, with performing, by the first gateway, network address translation (NAT) to translate the first public network address to a private network address of the endpoint.

Operations 400 continue at step 406, with forwarding, by the first gateway, the packet to an edge gateway of the data center.

Operations 400 continue at step 408, with forwarding, by the edge gateway, the packet to a second gateway associated with the second tenant within the data center without sending the packet to a public interface of the edge gateway.

Operations 400 continue at step 410, with forwarding, by the second gateway, the packet to the endpoint.

Certain embodiments further comprise receiving, by the first gateway, one or more NAT table entries from the edge gateway, wherein the performing of the NAT to translate the first public network address to the private network address of the endpoint is based on the one or more NAT table entries.

Some embodiments further comprise determining, by the second gateway, that the packet did not undergo firewall inspection at the edge gateway and applying, by the second gateway, one or more firewall rules to the packet based on the determining that the packet did not undergo firewall inspection at the edge gateway. In certain embodiments, the determining, by the second gateway, that the packet did not undergo firewall inspection at the edge gateway is based on an indication in the packet.

In some embodiments, the indication in the packet comprises a packet format associated with the data center, a packet marker, or absence of the packet marker.

Some embodiments further comprise receiving, by the second gateway, the one or more firewall rules from the edge gateway as part of a firewall synchronization.

Certain embodiments further comprise maintaining, by the second gateway, state information related to the packet, receiving, by the second gateway, from the endpoint, an additional packet in response to the packet, and performing, by the second gateway, NAT on the additional packet based on the state information related to the packet.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

The invention claimed is:

1. A method of gateway optimization, comprising:
receiving, at a first gateway associated with a first tenant within a data center, a packet directed to a first public network address of an endpoint associated with a second tenant within the data center;
performing, by the first gateway, network address translation (NAT) to translate the first public network address to a private network address of the endpoint;
forwarding, by the first gateway, the packet to an edge gateway of the data center;
forwarding, by the edge gateway, the packet to a second gateway associated with the second tenant within the data center without sending the packet to a public interface of the edge gateway; and
forwarding, by the second gateway, the packet to the endpoint.

2. The method of claim 1, further comprising:
receiving, by the first gateway, one or more NAT table entries from the edge gateway, wherein the performing of the NAT to translate the first public network address to the private network address of the endpoint is based on the one or more NAT table entries.

3. The method of claim 1, further comprising:
determining, by the second gateway, that the packet did not undergo firewall inspection at the edge gateway; and
applying, by the second gateway, one or more firewall rules to the packet based on the determining that the packet did not undergo firewall inspection at the edge gateway.

4. The method of claim 3, wherein the determining, by the second gateway, that the packet did not undergo firewall inspection at the edge gateway is based on an indication in the packet.

5. The method of claim 4, wherein the indication in the packet comprises:
a packet format associated with the data center;
a packet marker; or
absence of the packet marker.

6. The method of claim 3, further comprising:
receiving, by the second gateway, the one or more firewall rules from the edge gateway as part of a firewall synchronization.

7. The method of claim 1, further comprising:
maintaining, by the second gateway, state information related to the packet; receiving, by the second gateway, from the endpoint, an additional packet in response to the packet; and
performing, by the second gateway, NAT on the additional packet based on the state information related to the packet.

8. A system for gateway optimization, comprising:
at least one memory; and
at least one processor coupled to the at least one memory, the at least one processor and the at least one memory configured to:
receive, at a first gateway associated with a first tenant within a data center, a packet directed to a first public network address of an endpoint associated with a second tenant within the data center;
perform, by the first gateway, network address translation (NAT) to translate the first public network address to a private network address of the endpoint;
forward, by the first gateway, the packet to an edge gateway of the data center;
forward, by the edge gateway, the packet to a second gateway associated with the second tenant within the data center without sending the packet to a public interface of the edge gateway; and
forward, by the second gateway, the packet to the endpoint.

9. The system of claim 8, wherein the at least one processor and the at least one memory are further configured to:
receive, by the first gateway, one or more NAT table entries from the edge gateway, wherein the performing of the NAT to translate the first public network address to the private network address of the endpoint is based on the one or more NAT table entries.

10. The system of claim 8, wherein the at least one processor and the at least one memory are further configured to:
determine, by the second gateway, that the packet did not undergo firewall inspection at the edge gateway; and
apply, by the second gateway, one or more firewall rules to the packet based on the determining that the packet did not undergo firewall inspection at the edge gateway.

11. The system of claim 10, wherein the determining, by the second gateway, that the packet did not undergo firewall inspection at the edge gateway is based on an indication in the packet.

12. The system of claim 11, wherein the indication in the packet comprises:
a packet format associated with the data center;
a packet marker; or
absence of the packet marker.

13. The system of claim 10, wherein the at least one processor and the at least one memory are further configured to:
receive, by the second gateway, the one or more firewall rules from the edge gateway as part of a firewall synchronization.

14. The system of claim 8, wherein the at least one processor and the at least one memory are further configured to:
maintain, by the second gateway, state information related to the packet;
receive, by the second gateway, from the endpoint, an additional packet in response to the packet; and
perform, by the second gateway, NAT on the additional packet based on the state information related to the packet.

15. A non-transitory computer readable medium storing instructions that, when executed by one or more processors, cause the one or more processors to:
receive, at a first gateway associated with a first tenant within a data center, a packet directed to a first public network address of an endpoint associated with a second tenant within the data center;
perform, by the first gateway, network address translation (NAT) to translate the first public network address to a private network address of the endpoint;
forward, by the first gateway, the packet to an edge gateway of the data center;
forward, by the edge gateway, the packet to a second gateway associated with the second tenant within the data center without sending the packet to a public interface of the edge gateway; and
forward, by the second gateway, the packet to the endpoint.

16. The non-transitory computer readable medium of claim 15, wherein the instructions, when executed by the one or more processors, further cause the one or more processors to:
receive, by the first gateway, one or more NAT table entries from the edge gateway, wherein the performing of the NAT to translate the first public network address to the private network address of the endpoint is based on the one or more NAT table entries.

17. The non-transitory computer readable medium of claim 15, wherein the instructions, when executed by the one or more processors, further cause the one or more processors to:
determine, by the second gateway, that the packet did not undergo firewall inspection at the edge gateway; and
apply, by the second gateway, one or more firewall rules to the packet based on the determining that the packet did not undergo firewall inspection at the edge gateway.

18. The non-transitory computer readable medium of claim 17, wherein the determining, by the second gateway, that the packet did not undergo firewall inspection at the edge gateway is based on an indication in the packet.

19. The non-transitory computer readable medium of claim 18, wherein the indication in the packet comprises:
a packet format associated with the data center;
a packet marker; or
absence of the packet marker.

20. The non-transitory computer readable medium of claim 17, wherein the instructions, when executed by the one or more processors, further cause the one or more processors to:
receive, by the second gateway, the one or more firewall rules from the edge gateway as part of a firewall synchronization.

* * * * *